United States Patent
Liu et al.

(10) Patent No.: US 9,799,351 B1
(45) Date of Patent: Oct. 24, 2017

(54) SHORT YOKE LENGTH WRITER HAVING ASSIST COILS

(71) Applicant: Western Digital (Fremont), LLC, Fremont, CA (US)

(72) Inventors: Feng Liu, San Ramon, CA (US); Zhanjie Li, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/954,293

(22) Filed: Nov. 30, 2015

(51) Int. Cl.
*G11B 5/17* (2006.01)
*G11B 5/31* (2006.01)
*G11B 5/11* (2006.01)
*G11B 5/127* (2006.01)

(52) U.S. Cl.
CPC ............. *G11B 5/3123* (2013.01); *G11B 5/11* (2013.01); *G11B 5/1278* (2013.01); *G11B 5/17* (2013.01); *G11B 5/3116* (2013.01)

(58) Field of Classification Search
None
See application file for complete search history.

(56) References Cited

U.S. PATENT DOCUMENTS

| | | | |
|---|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |

(Continued)

FOREIGN PATENT DOCUMENTS

| | | |
|---|---|---|
| EP | 519729 A2 | 12/1992 |
| EP | 557094 A1 | 8/1993 |

*Primary Examiner* — Craig A. Renner
(74) *Attorney, Agent, or Firm* — Foley & Lardner LLP

(57) ABSTRACT

A magnetic apparatus has a media-facing surface (MFS), a pole, a top shield, a back gap and coil(s). The pole includes a yoke extension, a yoke between the yoke extension and the MFS, and a pole tip between the yoke and the MFS. The write gap is between the top shield and the pole tip. The back gap is recessed from the ABS and magnetically and physically connects the top shield to the yoke. The coil(s) energize the pole and have multiple turns. Part of a first turn is between the yoke and the top shield. Part of a second turn is recessed from the MFS and aligned with part of the yoke extension. Part of the first turn is between the part of the second turn and the MFS. The back gap is between part of the first turn and part of the second turn.

8 Claims, 7 Drawing Sheets

(56) References Cited

U.S. PATENT DOCUMENTS

| | | |
|---|---|---|
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |

(56) References Cited

U.S. PATENT DOCUMENTS

| | | |
|---|---|---|
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |

(56) References Cited

U.S. PATENT DOCUMENTS

| | | |
|---|---|---|
| 7,554,767 B1 | 6/2009 | Hu et al. |
| 7,583,466 B2 | 9/2009 | Kermiche et al. |
| 7,595,967 B1 | 9/2009 | Moon et al. |
| 7,623,322 B2 * | 11/2009 | Umehara et al. .... G11B 5/3133 360/125.74 |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,031 B2 | 2/2012 | Alex et al. |
| 8,116,032 B2 | 2/2012 | Contreras et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,633 B2 | 5/2012 | Contreras et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,155 B2 | 1/2013 | Contreras et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,411,390 B2 | 4/2013 | Franca-Neto et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |

(56) References Cited

U.S. PATENT DOCUMENTS

| | | | |
|---|---|---|---|
| 8,441,756 B1 | 5/2013 | Sun et al. |
| 8,443,510 B1 | 5/2013 | Shi et al. |
| 8,444,866 B1 | 5/2013 | Guan et al. |
| 8,446,690 B2 | 5/2013 | Alex et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,527 B2 | 1/2014 | Franca-Neto et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,804,284 B1* | 8/2014 | Ohtake et al. ........ G11B 5/1278 360/125.3 |
| 8,813,324 B2 | 8/2014 | Emley et al. |
| 2009/0116144 A1* | 5/2009 | Lee et al. ............. G11B 5/1278 360/125.01 |
| 2010/0061015 A1 | 3/2010 | Tanida |
| 2010/0290157 A1 | 11/2010 | Zhang et al. |
| 2011/0086240 A1 | 4/2011 | Xiang et al. |
| 2012/0111826 A1 | 5/2012 | Chen et al. |
| 2012/0182644 A1* | 7/2012 | Matsumoto et al. G11B 5/1278 360/123.01 |
| 2012/0216378 A1 | 8/2012 | Emley et al. |
| 2012/0230167 A1 | 9/2012 | Aoyama et al. |
| 2012/0237878 A1 | 9/2012 | Zeng et al. |
| 2012/0298621 A1 | 11/2012 | Gao |
| 2013/0016441 A1* | 1/2013 | Taguchi et al. ....... G11B 5/1278 360/121 |
| 2013/0038966 A1* | 2/2013 | Sasaki et al. ............ G11B 5/17 360/123.04 |
| 2013/0215532 A1* | 8/2013 | Taguchi et al. ........ G11B 5/3116 360/123.02 |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2013/0329319 A1* | 12/2013 | Sasaki et al. ............ G11B 5/17 360/123.12 |
| 2014/0154529 A1 | 6/2014 | Yang et al. |
| 2014/0175050 A1 | 6/2014 | Zhang et al. |
| 2014/0177099 A1* | 6/2014 | Sasaki et al. ........ G11B 5/1278 360/123.12 |

\* cited by examiner

SHORT YOKE LENGTH WRITER HAVING ASSIST COILS

BACKGROUND

FIG. 1 depicts a side view of a conventional magnetic recording apparatus 10. The magnetic recording apparatus 10 may be a perpendicular magnetic recording (PMR) apparatus. The conventional magnetic apparatus 10 includes a read apparatus 12 and a write apparatus 20. The conventional read apparatus 12 includes shields 14 and 18 and sensor 16. The read sensor 16 is typically a giant magnetoresistive (GMR) sensor or tunneling magnetoresistive (TMR) sensor. The write apparatus 20 includes a first or return pole 22, coils 24 and 32, back gap, auxiliary poles 28, main pole 30 and shield 34. Although not shown, the pole 30 may have leading and/or trailing edge bevels. In such cases, the pole 30 is shortest in the down track direction at the ABS.

Although the conventional magnetic recording head 10 functions, there are drawbacks. In particular, the conventional magnetic recording head 10 may not perform sufficiently at higher recording densities and higher recording speeds. For example, as recording areal density approaches 1 Tb/in$^2$ and above, the data recording rate may exceed 2.2 Gb/s. High data rates require rapid changes in the magnetic flux provided by the pole 22. The pole 22 may not have sufficiently low rise time for the magnetic flux. The write field provided by the main pole 30 may also be desired to meet particular standards, such as magnitude and gradient. The pole 22 may not be capable of meeting these standards. Accordingly, what is needed is a system and method for improving the performance of a magnetic recording head, particularly at higher areal densities.

DETAILED DESCRIPTION OF THE PREFERRED EMBODIMENTS

While the various embodiments disclosed are applicable to a variety of data storage devices such as magnetic recording disk drives, solid-state hybrid disk drives, networked storage systems etc., for the sake of illustration the description below uses disk drives as examples.

Figure 1:
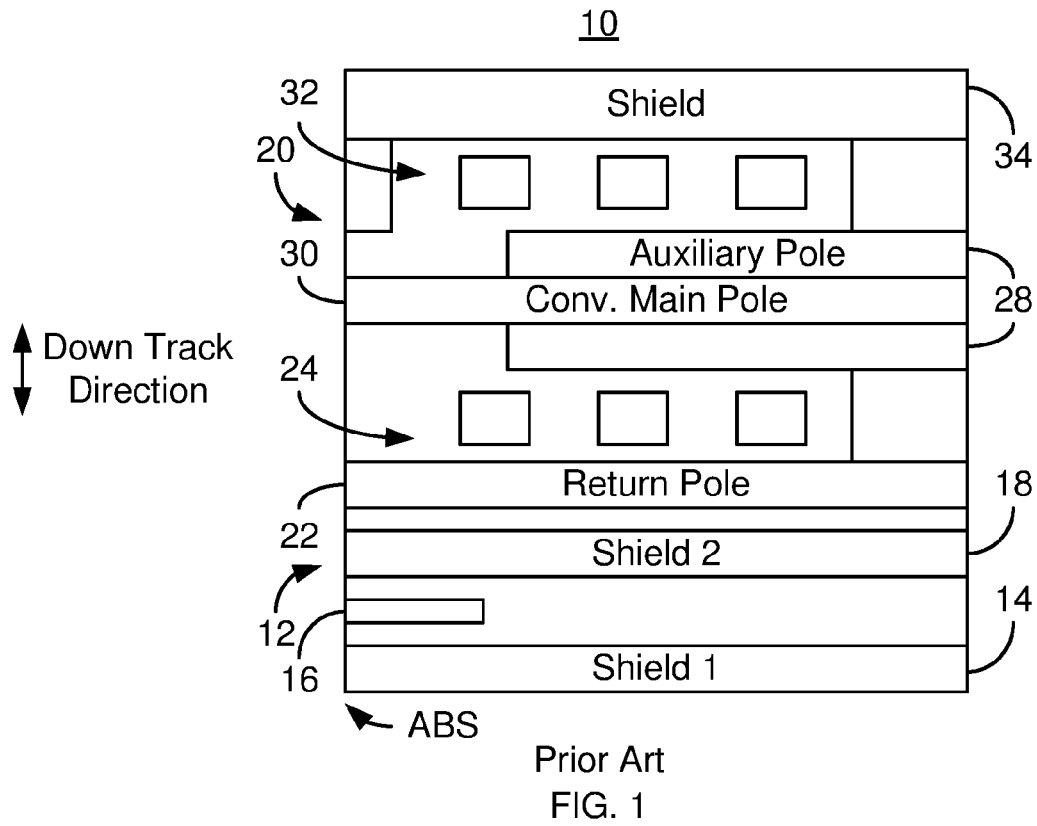
FIG. 1 depicts a side view of a conventional magnetic recording head.
Figure 2:
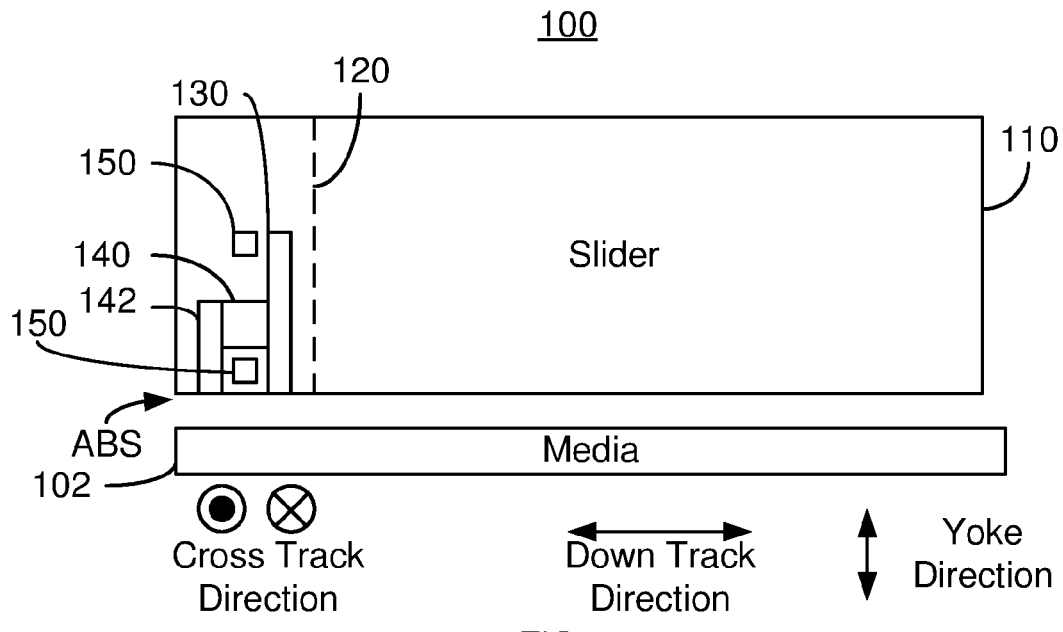
FIG. 2 depicts an exemplary embodiment of a magnetic recording disk drive.
Figure 3:
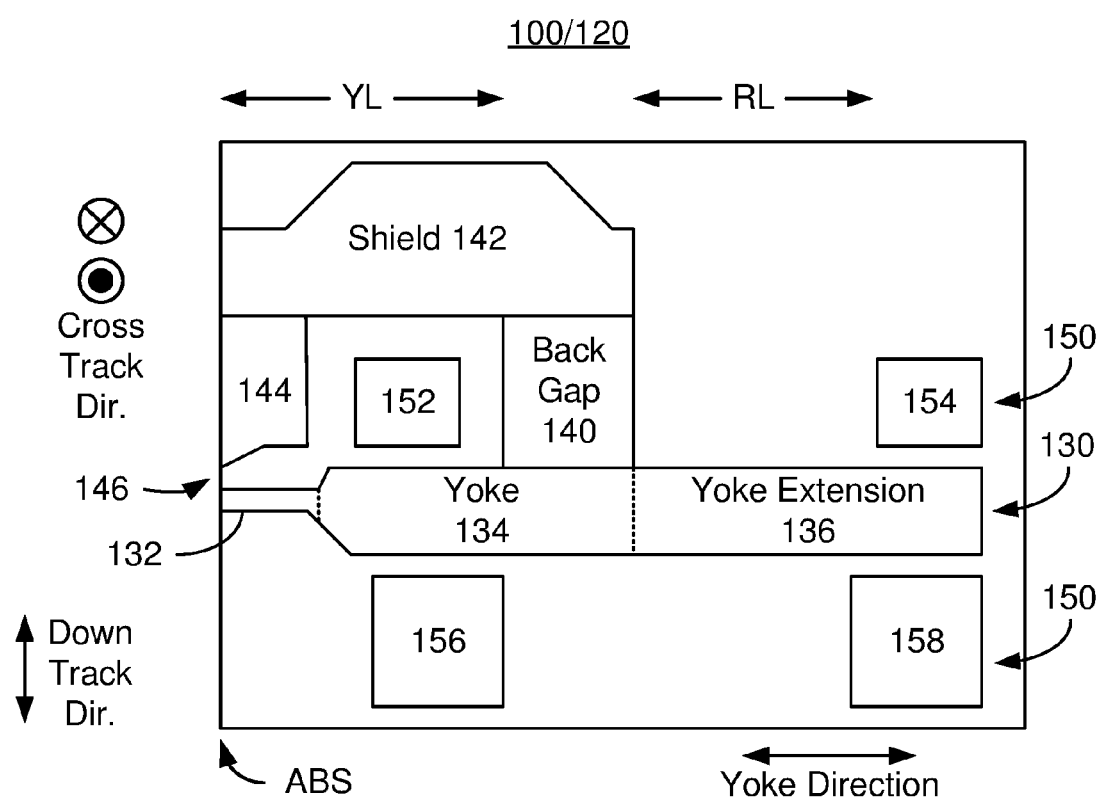
FIG. 3 depicts a side view of an exemplary embodiment of a magnetic recording write apparatus.

FIG. 2 depicts a side view of an exemplary embodiment of a portion of a disk drive 100 including a write apparatus 120. FIG. 3 depicts a close-up side view of an exemplary embodiment of a magnetic disk drive 100/write apparatus 120. For clarity, FIGS. 2-3 are not to scale. Referring to FIGS. 2-3, for simplicity not all portions of the disk drive 100 are shown. In addition, although the disk drive 100 is depicted in the context of particular components other and/or different components may be used. For example, circuitry used to drive and control various portions of the disk drive 100 is not shown. For simplicity, only single components 102, 110, 120 and their components are shown. However, multiples of each components 102, 110, 120 and/or and their sub-components, might be used. The disk drive 100 may be a PMR disk drive. However, in other embodiments, the disk drive 100 may be configured for other types of magnetic recording.

The disk drive 100 includes media 102, a slider 110 and the write apparatus 120. Additional and/or different components may be included in the disk drive 100. Although not shown, the slider 110 and thus the write apparatus 120 are generally attached to a suspension (not shown). The write apparatus 120 is fabricated on the slider 110 and includes a media-facing surface (MFS) proximate to the media 102 during use. In the embodiment shown, the MFS is an air-bearing surface (ABS). In general, the disk drive 100 includes a write apparatus 120 and a read apparatus. However, for clarity, only the write apparatus 120 is shown.

The write apparatus 120 includes a pole 130, a back gap 140, a top shield 142/144, write gap 146 and coil(s) 150. In other embodiments, different and/or additional components may be used in the write apparatus 120. For example, the write apparatus 120 might include a return pole.

The pole 130 includes a pole tip 132, a yoke 134 and a yoke extension 136. The separate portions 132, 134 and 136 of the pole 130 are delineated by dashed lines. The pole tip 132 is shown as occupying a portion of the ABS. However, in other embodiments, the pole tip 132 might be recessed from the ABS. The pole tip 132 is between the yoke 134 and the ABS. Similarly, the yoke 134 is between the yoke extension 136 and the ABS. The write gap 146 separates the pole tip 132 from a portion 144 of the top shield 142/144. The back gap 140 is recessed from the ABS. The back gap 140 magnetically and physically connects a portion 142 of the top shield 142/144 to the yoke 134 of the pole 130. In some embodiments, the edge of the back gap 140 furthest from the ABS defines the back edge of the yoke 134. The yoke extension 136 is the portion of the pole 130 that extends beyond the back gap 140 in the yoke direction. The yoke length, YL, of the pole 130, defined herein as the distance from the ABS to the front of the back gap 140, is reduced. In some embodiments, the yoke length is not more than three micrometers. In some such embodiments, the yoke length may be two micrometers or less.

The coil(s) 150 are used to energize the pole 130 for writing and include turns 152, 154, 156 and 158. In other embodiments, another number of turns may be used. For example, more turns recessed from the ABS in a manner analogous to the turns 154 and 158 may be used. Although termed separate turns, the turns 152, 154, 156 and 158 may be connected such that fewer turns are present. For example, the coil(s) 150 may be a helical coil. In such a case, the turns 152 and 156 may be part of the same turn. The turns 154 and 158 may be then part of the same turn. Similarly, if the coil(s) 150 are spiral coil(s), then the turns 152 and 154 may be part of the same turn. The turns 156 and 158 may thus be part of the same turn. Thus, as used herein, a "turn" of a coil may be the portion of the turn depicted in the drawing. In addition, although not shown, it is possible for the write apparatus 120 to have coil turns that are far from the ABS and not depicted in the drawings. Finally, in some embodiments, the turns 156 and 158 might be omitted.

One turn 152 is between the yoke 134 and a portion 142 of the top shield 142/144. Another turn 154 is recessed from the ABS such that the turn 154 is aligned with part of the yoke extension 136. Although shown as having its back edge aligned with the back edge of the yoke extension 136, the turn 154 might be closer to the ABS. However, the back gap 140 is between the turns 152 and 154. In some embodiments, the turn 154 is recessed from the ABS by at least two micrometers and not more than eight micrometers. In some embodiments, the turn 154 is recessed from the ABS by at least three micrometers. In addition, the turn 154 is separated from the back gap 140 by length RL. RL may be at least 0.25 µm, which allows the turn 154 to be electrically insulated from the back gap 140. In some embodiments, however, RL is significantly larger than 0.25 µm. In the embodiment shown, the turns 152 and 154 have the same cross-sectional area and shape. In other embodiments, the cross-sectional areas and/or shapes may differ.

As can be seen from FIG. 3, the turns 156 and 158 may be considered analogous to the turns 152 and 154, respectively. Thus, the turn 158 is recessed further from the ABS and aligned with the yoke extension 136. The turn 156 is aligned with the yoke 134. In the embodiment shown, the turns 156 and 158 have the same cross-sectional area and shape. In other embodiments, the cross-sectional areas and/or shapes may differ. In addition, the turns 152 and 156 are shown as having different cross-sectional area(s) than the turns 156 and 158. However, in other embodiments, the cross-sectional area(s) may be the same. Alternatively, the cross-sectional areas of the turns 156 and 158 may be smaller than that of the turns 152 and 154.

The turns 152 and 156 are closer to the ABS than the back edge of the back gap 140. Thus, the turns 152 and 156 may be considered primary turns while the turns 154 and 158 may be considered assist turns. The assist turns 154 and 158 provide additional current that aids (or assists) the turns 152 and 156 in energizing the pole 130. For example, the turns 152 and 158 may carry current in one direction (e.g. out of the plane of the page in FIG. 3) while the turns 154 and 156 carry current in the opposite direction. In other embodiments, the turns 152 and 156 may carry current in one direction while the turns 154 and 158 carry current in the opposite direction. Similarly, the turns 152 and 154 may carry current in one direction while the turns 156 and 158 carry current in the opposite direction. Other configurations for carrying current are possible.

In operation, current is driven through the turns 152, 154, 156 and 158 of the coil(s) 150 to energize the pole 130. In some embodiments, the current carried by the turns 152, 154, 156 and 158 is increased over that which might be used in the coils 24 and 32 of the conventional write apparatus 10. The current through the turns 152, 154, 156 and 158 may be increased such that the magnitude of the field produced by the pole 130 is analogous to that produced by the conventional pole 30. For example, the 150 coil may carry a current that is 150% of the current carried by the conventional coils 24 and 32. However, other values of the current are possible.

The magnetic disk drive 100 may exhibit improved performance. Because of the configuration of the turns 152, 154, 156 and 158 of the coil 150, the yoke length may be reduced. For example, in some embodiments, the yoke length for the main pole 130 may be not more than three micrometers. In some such embodiments, the yoke length may be not more than two micrometers. The response time of the pole 130 may thus be reduced. Data may be written at a higher rate. Further, because of the presence of the assist turns 154 and 158, the coil(s) 150 may include greater than one turn. Thus, more current may be driven in proximity to the pole 130. Therefore, the coil(s) 150 may better energize the pole 130. In particular, the pole 130 may be configured for a single turn 152/156 near the ABS, but include additional, assist turn(s) 154/158. As a result, a higher magnetic field may be generated in the main pole 130 for the same write current driven through the coil(s) 150. Thus, performance of the disk drive 100 may be improved.

Figure 4:
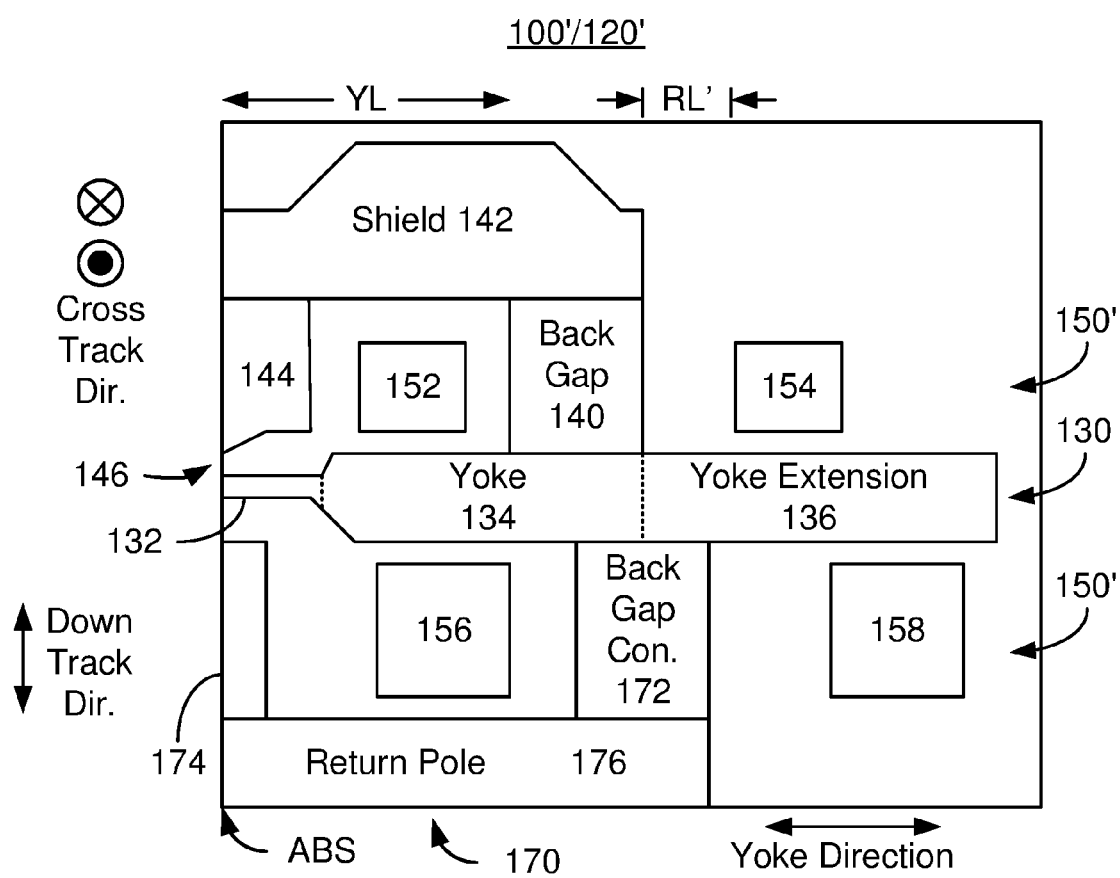
FIG. 4 depicts a side view of another exemplary embodiment of a magnetic recording write apparatus.

FIG. 4 depicts a side view of an exemplary embodiment of a magnetic disk drive 100'. More specifically, a portion of the apparatus 120' is depicted. For simplicity, only a portion of the magnetic recording apparatus 120' is shown. FIG. 4 is not to scale for clarity. The magnetic recording disk drive 100' is analogous to the magnetic disk drive 100. Consequently, analogous components have similar labels. The write apparatus 120' thus includes a slider (not shown), a pole 130, a back gap 140, a top shield 142/144, write gap 146 and coil(s) 150' analogous to the pole 130, back gap 140, top shield 142/144, write gap 146 and coil(s) 150, respectively, depicted in FIGS. 2-3.

The pole 130 includes a pole tip 132, a yoke 134 and a yoke extension 136 and which are analogous to those described in FIG. 2. The yoke length, YL, of the pole 130 is reduced. In some embodiments, the yoke length is not more than three micrometers. In some such embodiments, the yoke length may be two micrometers or less. The coil(s) 150' are used to energize the pole 130 for writing and include turns 152, 154, 156 and 158. The coil(s) 150' may be spiral or helical coils, as mentioned above. Turns 154 and 158 are still assist turns that are recessed from the ABS. One turn 152 is between the yoke 134 and a portion 142 of the top shield 142/144. The turn 154 further from the ABS. Thus, the turn 154 is a distance RL' from the back gap 140. The back gap 140 remains between the turns 152 and 154. The turn 154 is recessed from the ABS by a distance in the range of distances described above. As can be seen from FIG. 4, the turns 156 and 158 may be considered analogous to the turns 152 and 154, respectively. The turn 158, though recessed from the ABS and aligned with the yoke extension 136, is closer to the ABS than in FIGS. 2-3. Thus, the back edge of the turn 158 is not substantially the same distance from the ABS as is the back edge of the yoke extension 136.

The magnetic write apparatus 120' also includes a return pole 170. The return pole 170 includes a front gap connection 174, a back gap connection 172 and a central region 176. The front gap connection 174 has a portion at the ABS that may act as a leading shield. The back gap connection 172 that connects the return pole 170 to the yoke 134 and, in the embodiment shown, the yoke extension 136 of the pole 130. Thus, in the embodiment shown, the back gap connection 172 is recessed further from the ABS in the yoke direction than the back gap 140. However, the back gap connection 172 may be a different distance from the ABS. In some embodiments, the front gap connection 174 and/or the back gap connection 172 might be omitted.

The magnetic write apparatus 120' may share the benefits of the magnetic write apparatus 120. Because of the configuration of the turns 152, 154, 156 and 158 of the coil 150', the yoke length may be reduced. For example, in some embodiments, the yoke length for the main pole 130 may be not more than three micrometers. In some such embodiments, the yoke length may be not more than two micrometers. The response time of the pole 130 may be reduced and data written at a higher rate. Because of the use of the assist turns 154 and 158, the coil(s) 150' may include more than one turn close to the pole 130 despite the reduced yoke length. As a result, a higher magnetic field may be generated in the main pole 130 for the same write current driven through the coil(s) 150'. Thus, performance of the disk drive 100' may be improved. Further, use of the return pole 170 including the front gap connection 174 and the back gap connection 172 may improve the wide area track erasure (WATER) for the write apparatus 120'. The return pole 170 may aid in shielding other tracks from the (possibly higher) current driven through the coils 150'. Thus, the improved data rate may be attained without adversely affecting WATER.

Figure 5:
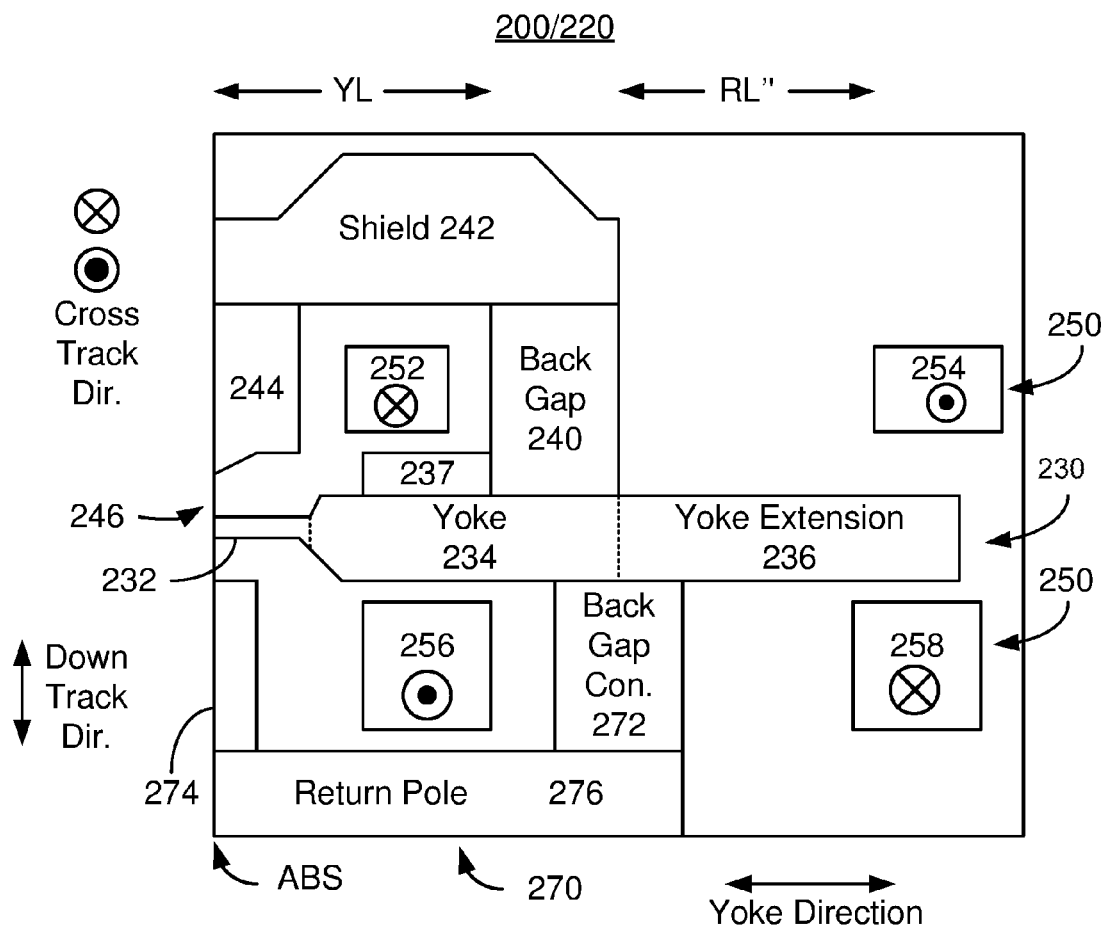
FIG. 5 depicts a side view of another exemplary embodiment of a magnetic recording apparatus.

FIG. 5 depicts a side view of an exemplary embodiment of a magnetic disk drive 200. More specifically, a portion of a write apparatus 220 is depicted. For simplicity, only a portion of the magnetic recording apparatus 220 is shown. FIG. 5 is not to scale for clarity. The magnetic recording disk drive 200 is analogous to the magnetic disk drive 100 and 100'. Consequently, analogous components have similar labels. The write apparatus 220 thus includes a slider (not shown), a pole 230, a back gap 240, a top shield 242/244, write gap 246, coil(s) 250 and return pole 270 analogous to the pole 130, back gap 140, top shield 142/144, write gap 146, coil(s) 150/150' and return pole 170, respectively.

The pole 230 includes a pole tip 232, a yoke 234 and a yoke extension 236 which are delineated by dashed lines and analogous to those described in FIGS. 2-4. The yoke length, YL, of the pole 230 is reduced. In some embodiments, the yoke length is not more than three micrometers. In some such embodiments, the yoke length may be two micrometers or less. The coil(s) 250 are used to energize the pole 230 for writing and include turns 252, 254, 256 and 258. The coil(s) 250 may be spiral or helical coils, as mentioned above. Turns 254 and 258 are assist turns that are recessed from the ABS. One turn 252 is between the yoke 234 and a portion 242 of the top shield 242/244. The turn 254 is further from the ABS. Thus, the turn 254 is a distance RL" from the back gap 240. Although a portion of the turn 254 is aligned with the yoke extension 236, another portion of the turn 254 further from the ABS than the yoke extension 236. The back gap 240 remains between the turns 252 and 254. The turns 256 and 258 are analogous to the turns 252 and 254, respectively. The turn 258, though recessed from the ABS and partially aligned with the yoke extension 236, the back edge of the turn 258 is further from the ABS than the back edge of the yoke extension 236. The magnetic write apparatus 220 also includes a return pole 270 having a front gap connection 274, a back gap connection 272 and a central region 276. In another embodiment, the return pole 270 might be omitted. Also depicted in FIG. 5 is one configuration in which current may be driven through the turns 252, 254, 256 and 258.

The magnetic write apparatus 220 may share the benefits of the magnetic write apparatuses 120 and 120'. Because of the configuration of the turns 252, 254, 256 and 258, the yoke length may be reduced in a manner analogous to that described above. The response time of the pole 230 may be reduced and data written at a higher rate. Use of the assist turns 254 and 258, more current can be driven close to the pole 230 despite the reduced yoke length. As a result, a higher magnetic field may be generated in the main pole 230 for the same write current driven through the coil(s) 250. Further, the use of the return pole 270 having front gap connection 274 and the back gap connection 272 may improve the WATER for the write apparatus 220. Thus, the improved data rate and field may be attained without adversely affecting WATER.

Figure 6:
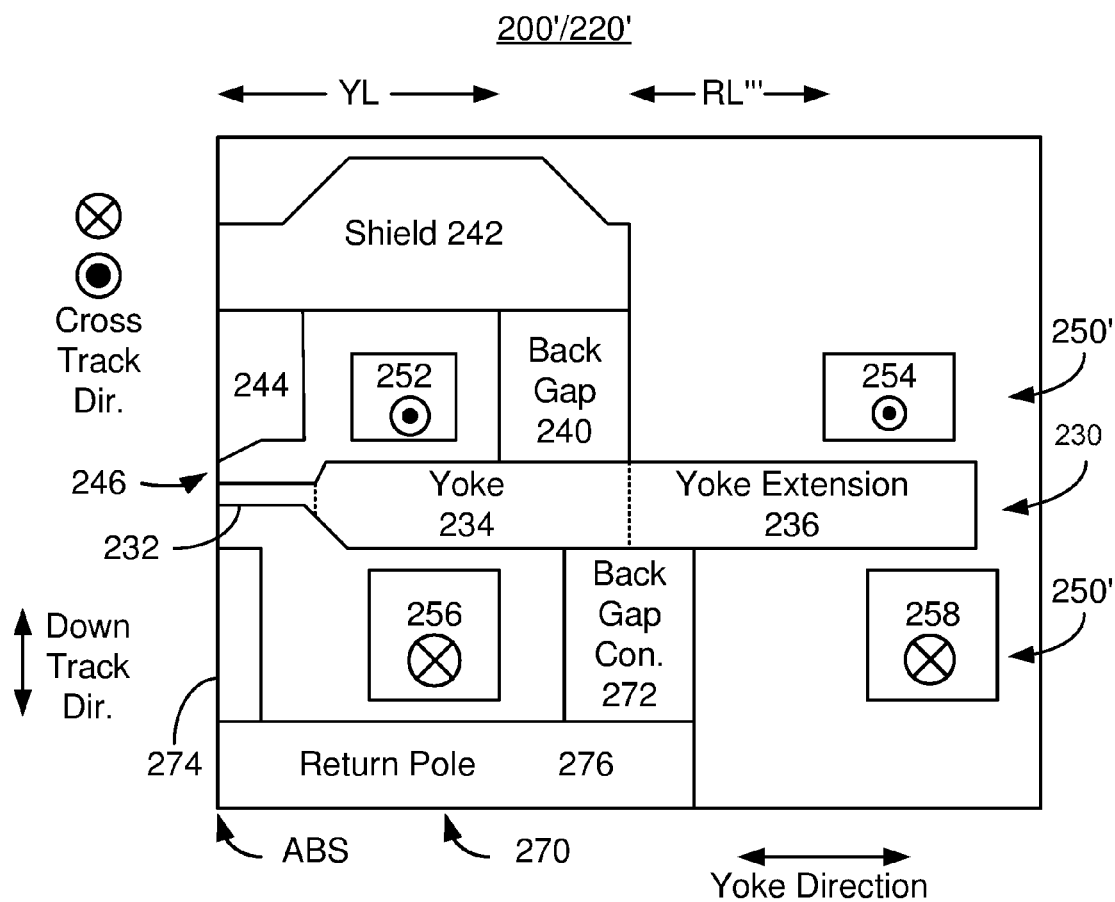
FIG. 6 depicts a side view of another exemplary embodiment of a magnetic recording write apparatus.

FIG. 6 depicts a side view of an exemplary embodiment of a magnetic disk drive 200'. More specifically, a portion of a write apparatus 220' is depicted. For simplicity, only a portion of the magnetic recording apparatus 220' is shown. FIG. 6 is not to scale for clarity. The magnetic recording disk drive 200' is analogous to the magnetic disk drive 100, 100' and 200. Consequently, analogous components have similar labels. The write apparatus 220' thus includes a slider (not shown), a pole 230, a back gap 240, a top shield 242/244, write gap 246, coil(s) 250' and return pole 270 analogous to the pole 130/230, back gap 140/240, top shield 142/144/242/244, write gap 146/246, coil(s) 150/150'/250 and return pole 270, respectively.

The pole 230 includes a pole tip 232, a yoke 234 and a yoke extension 236 which are delineated by dashed lines and analogous to those described in FIGS. 2-4. The yoke length, YL, of the pole 230 is reduced. In some embodiments, the yoke length is not more than three micrometers. In some such embodiments, the yoke length may be two micrometers or less. The coil(s) 250' are used to energize the pole 230 for writing and include turns 252, 254, 256 and 258. The coil(s) 250' may be spiral or helical coils, as mentioned above. Turns 254 and 258 are assist turns that are recessed from the ABS. One turn 252 is between the yoke 234 and a portion 242 of the top shield 242/244. The turn 254 is further from the ABS. Thus, the turn 254 is a distance RL'" from the back gap 240. The turn 254 is aligned with part of the yoke extension 236. The back gap 240 remains between the turns 252 and 254. The turns 256 and 258 are analogous to the turns 252 and 254, respectively. The turn 258, though recessed from the ABS and partially aligned with the yoke extension 236, the back edge of the turn 258 is further from the ABS than the back edge of the yoke extension 236. The magnetic write apparatus 220 also includes a return pole 270 having a front gap connection 274, a back gap connection 272 and a central region 276. Also depicted in FIG. 6 is another configuration in which current may be driven through the turns 252, 254, 256 and 258.

The magnetic write apparatus 220' may share the benefits of the magnetic write apparatuses 120, 120' and 220. Because of the configuration of the turns 252, 254, 256 and 258, the yoke length may be reduced in a manner analogous to that described above. The response time of the pole 230 may be reduced and data written at a higher rate. Use of the assist turns 254 and 258, more current can be driven close to the pole 230 despite the reduced yoke length. As a result, a higher magnetic field may be generated in the main pole 230 for the same write current driven through the coil(s) 250'. Further, the use of the return pole 270 having front gap connection 274 and the back gap connection 272 may improve the WATER for the write apparatus 220. Thus, the improved data rate and field may be attained without adversely affecting WATER.

Figure 7:
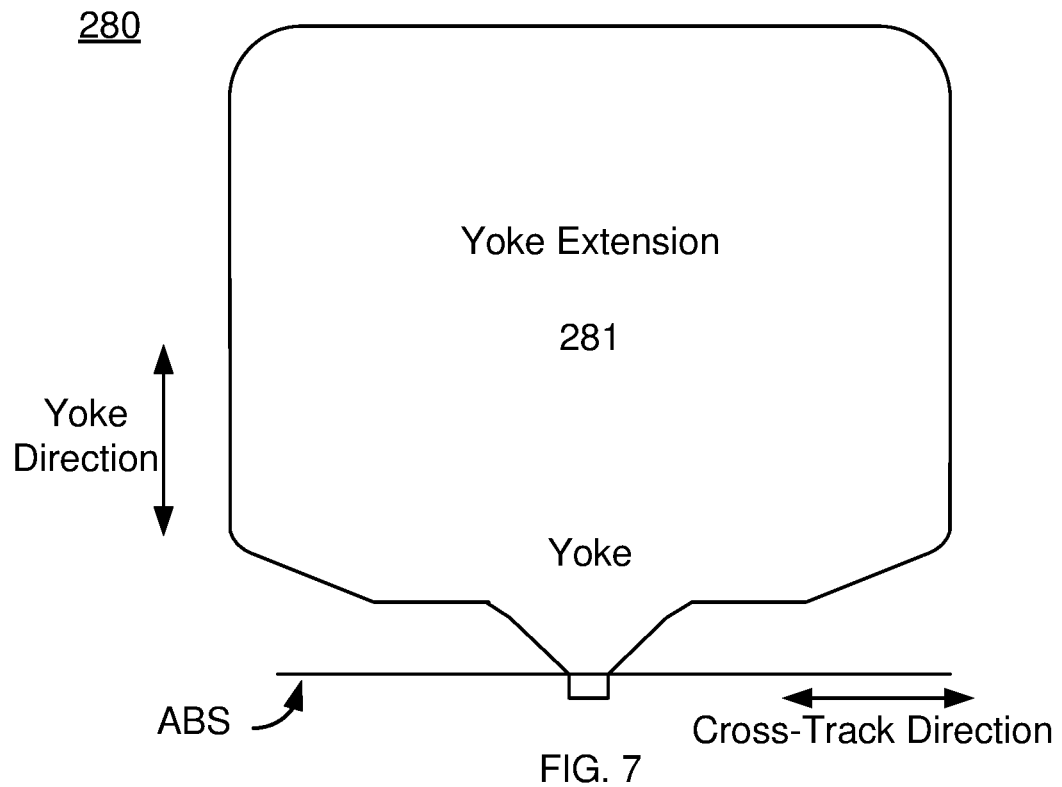
FIG. 7 depicts a plan view of an exemplary embodiment of a magnetic recording apparatus.

FIG. 7 depicts a plan view of an exemplary embodiment of a magnetic write apparatus 280. For simplicity, only a portion of the magnetic recording apparatus 280 is shown. FIG. 7 is not to scale for clarity. The magnetic write apparatus 280 is analogous to the magnetic write apparatus 120, 120', 220 and 220'. Consequently, analogous components have similar labels. The write apparatus 280 thus includes a pole 281 analogous to the pole 130/230. For simplicity, other components of the write apparatus 280 are not shown. In the embodiment shown, the yoke and yoke extension region have a substantially rectangular footprint. However, other shapes are possible.

Figure 8:
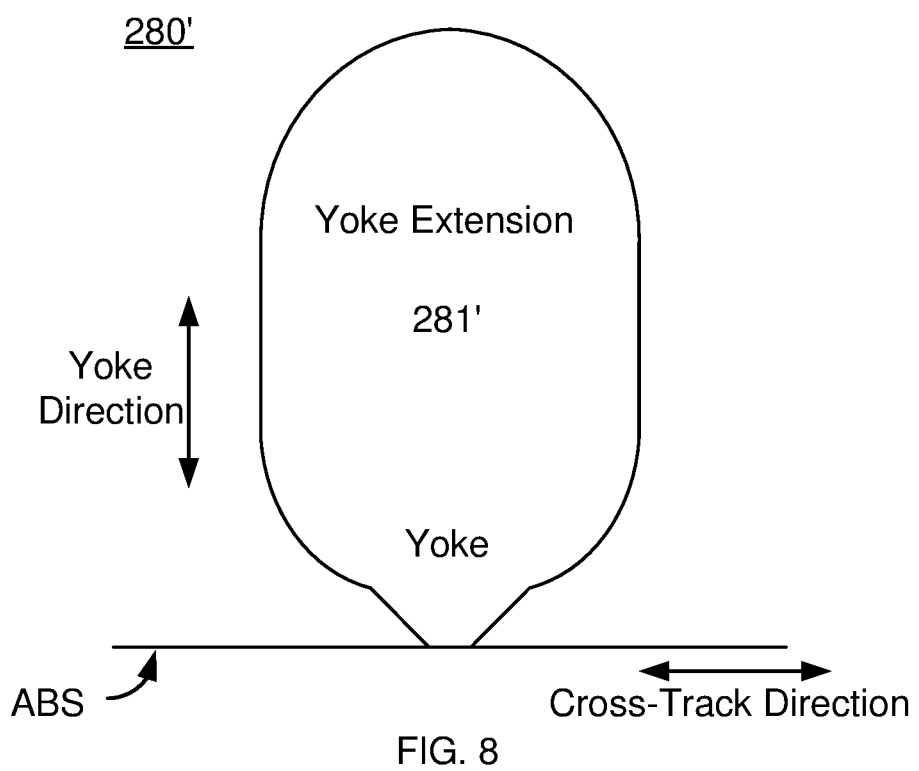
FIG. 8 depicts a plan view of another exemplary embodiment of a magnetic recording apparatus.

FIG. 8 depicts a plan view of an exemplary embodiment of a magnetic write apparatus 280'. For simplicity, only a portion of the magnetic recording apparatus 280' is shown. FIG. 8 is not to scale for clarity. The magnetic write apparatus 280' is analogous to the magnetic write apparatus 120, 120', 220, 220' and 280. Consequently, analogous components have similar labels. The write apparatus 280 thus includes a pole 281' analogous to the pole 130/230/281. For simplicity, other components of the write apparatus 280' are not shown. In the embodiment shown, the yoke and yoke extension region have a substantially oval footprint. However, other shapes are possible. Various configurations have been depicted in FIGS. 2-8. Although specific features have been highlighted, one of ordinary skill in the art that the features described herein may be combined in other manners not explicitly depicted.

Figure 9:
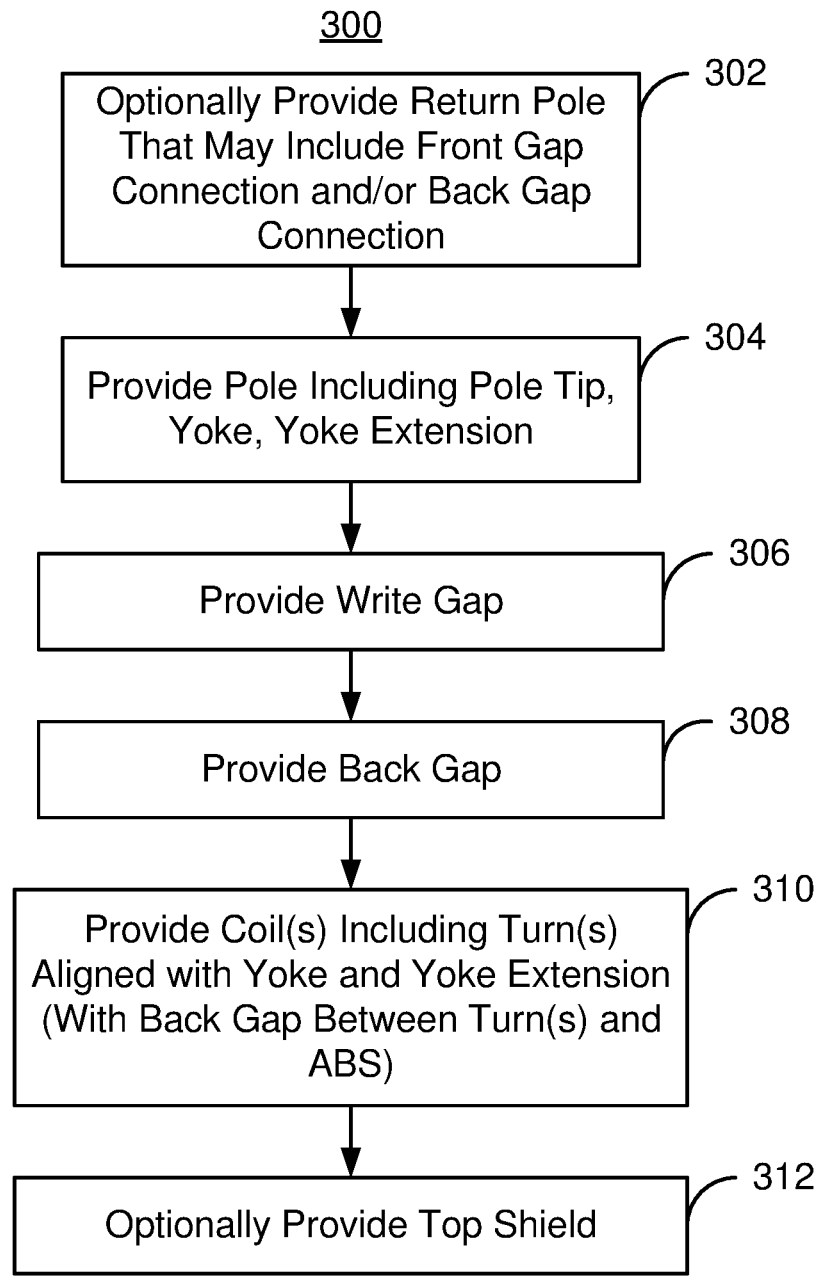
FIG. 9 is flow chart depicting an exemplary embodiment of a method for fabricating a magnetic recording head.

FIG. 9 depicts an exemplary embodiment of a method 300 for providing a magnetic recording apparatus having a pole that may have a shortened yoke length. For simplicity, some steps may be omitted, interleaved, combined and/or include substeps. The method 300 is also described in the context of providing a magnetic recording head 100' depicted in FIG. 4. The method 300 may also be used to fabricate other magnetic recording apparatuses including but not limited to any combination of 120, 120', 220, 220', 280 and/or 280'. In addition, the method 300 may be used to fabricate multiple magnetic recording heads at substantially the same time. The method 300 is also described in the context of particular layers. A particular layer may include multiple materials and/or multiple sub-layers. The method 300 also may start after formation of other portions of the magnetic recording apparatus. For example, the method 300 may start after a read apparatus, return pole/shield and/or other structure have been fabricated.

Referring to FIGS. 4 and 9, the return pole 170 may optionally be provided, via step 302. In some embodiments, the back gap connection 172 and/or the front gap connection 174 may be omitted. The pole 130 is provided, via step 304. Step 304 may include using a damascene process. For example, a trench may be formed in a layer and the material(s) for the pole 130 deposited and patterned. One or more ferromagnetic materials are deposited. The pole tip 132, yoke 134 and yoke extension 136 may be formed. Other methods may also be used to form the pole 130 including but not limited to full film deposition of magnetic materials and removal for example via milling and/or lapping.

The write gap 146 may be provided, via step 306. In addition, the back gap 140 is formed, via step 308. The coil(s) 150 are provided, via step 310. Portions of step 310 may thus be interleaved with the remaining steps of the method 300. For example, the turns 156 and 158 may be provided before the formation of the pole 130. However, the other portions of the coil(s) 150 may be provided after the pole 130 has been formed. Step 310 may also include depositing and patterning the material(s) used for the coil(s) 150. Step 310 may include forming helical coil(s) formed of the coils 150. Alternatively, one or two spiral coils may be formed using turns 152, 154, 156 and 158. The turns 152, 154, 156 and 158 are also located as depicted in the drawings. For example, the turn 152 is separated from the turn 154 by the back gap 140. The shield(s) 142/144 may also optionally be provided, via step 312.

Using the method 300, the magnetic write apparatuses 120, 120', 220, 220', 280 and/or 280' may be provided. Thus, the benefits of the magnetic apparatuses 120, 120', 220, 220', 280 and/or 280' may be achieved.

What is claimed is:

1. A magnetic write apparatus comprising:
   a pole comprising a pole tip, a yoke extending away from the pole tip, and a yoke extension extending away from the yoke, wherein a front edge of the yoke extension abuts the yoke and a back edge of the yoke extension faces away from the yoke;
   a first turn of a coil located above the yoke and aligned with the yoke; and
   a second turn of the coil located above the yoke and aligned with the yoke extension, wherein a back edge of the second turn that is farthest away from the pole tip is aligned with the back edge of the yoke extension.

2. The magnetic write apparatus of claim 1, further comprising a third turn of the coil located below the yoke and aligned with the yoke, and a fourth turn of the coil located below the yoke, wherein a back edge of the fourth turn is aligned with the back edge of the second turn.

3. A magnetic write apparatus having a media-facing surface (MFS), the magnetic write apparatus comprising:
   a pole including a pole tip proximate to the MFS, a yoke and a yoke extension, the pole tip being between the yoke and the MFS, the yoke being between the yoke extension and the MFS;
   a write gap at the MFS;
   a top shield having a first portion separated from the pole tip by the write gap;
   a back gap recessed from the MFS, the back gap magnetically and physically connecting a second portion of the top shield to the yoke of the pole; and
   at least one coil for energizing the pole, the at least one coil comprising a plurality of turns including a first turn, a second turn, a third turn, and a fourth turn, a portion of the first turn being between the yoke and the top shield, a portion of the second turn being recessed from the MFS such that the portion of the first turn is between the portion of the second turn and the MFS, the portion of the second turn being aligned with a first portion of the yoke extension, the back gap being between the portion of the first turn and the portion of the second turn in a direction perpendicular to the MFS, and
   wherein a portion of the third turn is located below the yoke and aligned with the yoke, and a portion of the fourth turn is located below the yoke extension and aligned with a second portion of the yoke extension,
   wherein a back edge of the second turn and a back edge of the fourth turn align with a back edge of the yoke extension.

4. The magnetic write apparatus of claim 1 wherein the portion of the second turn is recessed from the MFS by at least two microns and not more than eight microns.

5. The magnetic write apparatus of claim 1 wherein the at least one coil is selected from a helical coil and a spiral coil.

6. The magnetic write apparatus of claim 1 wherein the yoke has a yoke length of not more than two microns.

7. The magnetic write apparatus of claim 3, wherein the portion of the second turn and the portion of the fourth turn are located beyond the top shield.

8. A data storage device comprising:
   a media; and
   a slider having a media-facing surface (MFS), the slider including a pole, a write gap, a top shield, a back gap and at least one coil, the pole comprising a pole tip proximate to the S, a yoke and a yoke extension, the pole tip being between the yoke and the MFS, the yoke being between the yoke extension and the MFS, the top shield having a first portion separated from the pole tip by the write gap, the back gap being recessed from the MFS, the back gap magnetically and physically connecting a second portion of the top shield to the yoke of the pole, the at least one coil having a plurality of turns including a first turn, a second turn, a third turn, and a fourth turn, a portion of the first turn being between the yoke and the top shield, a portion of the second turn being recessed from the MFS such that the portion of the first turn is between the portion of the second turn and the MFS, the back gap being between the portion of the first turn and the portion of the second turn in a direction perpendicular to the MFS, the yoke being between the portion of the first turn and a portion of the third turn, the yoke extension being between the portion of the second turn and a portion of the fourth turn, the portion of the second turn and the portion of the fourth turn being aligned with a portion of the yoke extension, and wherein the top shield does not extend over the portion of the second turn and the portion of the fourth turn, wherein a back edge of the second turn and a back edge of the fourth turn align with a back edge of the yoke extension.

\* \* \* \* \*